United States Patent
Schmidt et al.

(10) Patent No.: US 8,671,160 B2
(45) Date of Patent: Mar. 11, 2014

(54) METHOD FOR ADMITTING AN INFORMATION PROVIDER TO A DATA TRANSMISSION PROCESS, AND TRANSMISSION DEVICE

(75) Inventors: Markus Schmidt, Nürnberg (DE); Horst Schreiner, Fürth (DE); Gudrun Zahlmann, Neumarkt (DE)

(73) Assignee: Siemens Aktiengesellschaft, Munich (DE)

( * ) Notice: Subject to any disclaimer, the term of this patent is extended or adjusted under 35 U.S.C. 154(b) by 2188 days.

(21) Appl. No.: 10/562,031

(22) PCT Filed: Jun. 14, 2004

(86) PCT No.: PCT/EP2004/006387
§ 371 (c)(1),
(2), (4) Date: Apr. 21, 2006

(87) PCT Pub. No.: WO2004/114174
PCT Pub. Date: Dec. 29, 2004

(65) Prior Publication Data
US 2006/0247935 A1 Nov. 2, 2006

(30) Foreign Application Priority Data
Jun. 24, 2003 (DE) .................... 103 28 383

(51) Int. Cl.
*H04L 29/00* (2006.01)
*G06F 15/16* (2006.01)
*G06F 17/30* (2006.01)

(52) U.S. Cl.
CPC .............. *H04L 29/00* (2013.01); *G06F 15/16* (2013.01); *G06F 17/30* (2013.01); *G06F 17/3053* (2013.01)
USPC ........... 709/218; 709/207; 709/240; 370/235; 707/723

(58) Field of Classification Search
CPC ......... H04L 29/00; H04L 45/00; H04L 45/28; H04L 45/22; H04L 47/12; H04L 47/10; G06F 15/16; G06F 17/30; G06F 17/3063
USPC ........ 709/207, 218, 240, 203; 705/42, 43, 45, 705/64, 4; 370/60, 61, 218, 230, 235; 707/1–5, 100, 104.1, 706, 736, 723
See application file for complete search history.

(56) References Cited

U.S. PATENT DOCUMENTS 5,414,427 A * 5/1995 Gunnarsson .................... 342/51
5,862,223 A   1/1999 Walker et al.

(Continued)

FOREIGN PATENT DOCUMENTS

GB    2 357 675 A    6/2001
WO    WO 97/26612   7/1997

(Continued)

OTHER PUBLICATIONS

German Office Action (dated Apr. 26, 2007).

*Primary Examiner* — Ella Colbert
(74) *Attorney, Agent, or Firm* — Harness, Dickey & Pierce, P.L.C.

(57) ABSTRACT

In a method for admitting an information provider to transmit information, a transmission device receives test data transmitted by an information provider, and the transmission device evaluates the quality of the test data. The test data represents information offered by the information provider. Depending on the quality of the test data, the transmission device admits the information provider to a system for transmitting information between information providers and information seekers. The transmission device then matches one or more information seekers with the information provider.

19 Claims, 2 Drawing Sheets

(56) References Cited

U.S. PATENT DOCUMENTS

| | | | |
|---|---|---|---|
| 5,878,215 A * | 3/1999 | Kling et al. | 709/207 |
| 5,940,812 A | 8/1999 | Tengel et al. | |
| 5,960,403 A * | 9/1999 | Brown | 705/2 |
| 5,987,454 A * | 11/1999 | Hobbs | 1/1 |
| 6,055,512 A * | 4/2000 | Dean et al. | 705/17 |
| 6,453,297 B1 | 9/2002 | Burks et al. | |
| 6,658,568 B1 | 12/2003 | Ginter et al. | |
| 7,209,930 B2 * | 4/2007 | Maeda et al. | 1/1 |
| 7,698,154 B2 * | 4/2010 | Marchosky | 705/3 |
| 2002/0026383 A1 * | 2/2002 | Goto et al. | 705/26 |
| 2003/0221010 A1 * | 11/2003 | Yoneya et al. | 709/227 |
| 2003/0233397 A1 * | 12/2003 | Katz et al. | 709/200 |

FOREIGN PATENT DOCUMENTS

| | | | | |
|---|---|---|---|---|
| WO | WO 98/48546 | * | 10/1998 | H04L 29/06 |
| WO | WO 02/06990 | | 1/2002 | |
| WO | WO 02/06990 A1 | | 1/2002 | |

* cited by examiner

METHOD FOR ADMITTING AN INFORMATION PROVIDER TO A DATA TRANSMISSION PROCESS, AND TRANSMISSION DEVICE

This application is the national phase under 35 U.S.C. §371 of PCT International Application No. PCT/EP2004/006387 which has an International filing date of Jun. 14, 2004, which designated the United States of America and which claims priority on German Patent Application number DE 103 28 383.8 filed Jun. 24, 2003, the entire contents of which are hereby incorporated herein by reference.

FIELD

The invention generally relates to a method for admitting an information provider to a process for transmitting data or other information between information providers and information seekers via a transmission device. In addition, the invention generally relates to a corresponding transmission device.

BACKGROUND

The quantity of information which is generally available has recently been increasing in leaps and bounds. The result is that the significance of concepts for accessing information or transmitting or switching information is continuously increasing.

Today, information is frequently transmitted via a data transmission system in which transmission processes can be automatically performed with the aid of suitable transmission devices. Such data transmission systems such as the internet or an in-house intranet are communication networks which include a number of computers or servers positioned at arbitrary sites. As a rule, the users of such data transmission systems are connected to the system by means of correspondingly equipped terminals, e.g. terminals, PCs, laptops, mobile radio devices, PDAs etc., equipped, e.g. with suitable interface cards, and can transmit any data to the system or call up any data from the system via the terminals.

Such data transmission systems—particularly the internet—have also been increasingly used for trading goods and services in recent years. In this context, on the one hand, the providers of goods or services can present themselves on "web pages", which are technically implemented, for example, on a server of the provider himself, or of a provider of the provider, connected to the data transmission system or belonging to the data transmission system. The potential customers (also called enquirers in the text which follows) can call up these web pages via the data transmission system and thus inform themselves about the provider and his offers, respectively, or order goods or services directly.

If an enquirer is looking for a particular item or service, there is the possibility, on the one hand, to use a so-called "search engine" as a simple transmission device which, by way of the search terms specified, i.e. the enquiry data in this case, lists all web pages found which are correlated with these search terms. On the other hand, an enquirer can also use transmission devices provided for such a purpose within the data transmission system. These are special devices which, in most cases, are implemented in the form of software modules on one or more networked servers and which are essentially used for presenting, on the one hand offer data by the most varied providers of a particular item or service and, on the other hand, enquiry data of the individual enquirers, to compare these with one another and to ensure the smoothest possible communication between providers and enquirers. Such transmission devices are also called "virtual market places" because of their function similar to a real market place.

Such virtual market places are described, for example, in WO 97/26612 A1. In this document, various market places are accessed by way of an agent system. To each user, a personal agent is allocated. In this context, the software agent is understood to be a device which is capable of performing various delegated electronic actions for the user or another agent. The advantage of this agent system resides in, among other things, that by means of the agents, an enquirer can be anonymously active on the most varied markets in order to compare and to evaluate the most varied products and to buy products.

However, a fundamental problem of all previously known transmission devices occurs when the goods for which the enquirer is looking for a suitable provider are valuable information such as, for example, demographic information procured and assembled with great effort, patient data, information on industrial rights etc. Unlike the case of a material product such as, e.g. a television set, computer or also a particular known software, the extent and quality of what the enquirer is ultimately receiving from the provider in the case of a purchase is not apparent right away. As a rule, therefore, before concluding the trade, the enquirer would like to know as accurately as possible what information he can obtain with what quality from the provider in order to ensure that this is the information wanted by him.

On the other hand, the provider cannot communicate the information for the enquirer, or generally provide it to the transmission devices, even before a binding agreement about the trade because the information only has value for as long as it is not generally known and cannot be procured at any time by the enquirer even without payment to the provider. When the above transmission devices are used for finding information providers, the enquirers currently have to rely on trusting the provider, for example because they already know the provider from previous information purchases or have obtained recommendations for this provider from other enquirers.

SUMMARY

It is the object of at least one embodiment of the present invention to specify a method for admitting an information provider to a method for transmitting information, and a transmission device by which an information-seeker is enabled to efficiently access information which corresponds to the requirements of the information-seeker.

According to at least one embodiment of the invention, test data are transmitted by an information provider to the transmission device and received by the transmission device, the test data representing information offered by the respective information provider. The quality of the test data is evaluated by the transmission device and the information provider is admitted to the method for transmitting information between information providers and information-seekers by the transmission device in dependence on the quality of the test data.

Thus, only those information providers or only information from those information providers which have demonstrated by the provision of test data that the corresponding information or data offered has sufficiently high quality are admitted to the method for transmitting information.

The evaluation of the quality of the test data and the admission of information providers depending on this can be implemented, in particular, by a security layer which is provided in the transmission device, by the transmission device or in connection with the transmission device. At the same time, this security layer forms a neutral brokering entity. This makes it possible to prevent an information-seeker from achieving in particular, free access to information even before information is communicated. In addition, at least one embodiment of the invention makes it possible to achieve that information seekers participating in the transmitting method can rely on a predetermined quality of the information offered without themselves having to develop and use elaborate evaluation methods for the quality of the information.

The admission of an information provider to at least one embodiment of the method for transmitting information relates, in particular, to a first-time admission of an information provider who has hitherto been unknown to the transmission device. However, at least one embodiment of the invention also includes a case where the admission of an information provider already known to the transmission device and having a new set of information is made dependent on the evaluation of the quality of test data which represent the new set of information.

For the evaluation of the quality of test data, various criteria and methods can be used depending on the type of test data. Thus, for example, data from the medical field have a good quality when they are suitable for statistical enquiries for the purpose of medical or pharmaceutical research. This requires that the test data contain not only measurement values but also background information which describes how the measurement values were obtained or, respectively, the boundary conditions of the measurements. For example, blood pressure measurement values only exhibit good quality if, together with the blood pressure measurement values, the corresponding measuring time also belongs to the test data. Specifying the measuring method, which can vary, for example, from hospital to hospital, also increases the quality of the test data and the corresponding information offered. Such background information can be specified in the medical field, for example by specifying the national or international standards or guidelines used during the measurement or the preceding treatment. The presence of ontologies in the information offered can also indicate a higher quality of information.

A transmission device can then be set up, for example, in such a manner that an information provider with its information offered, which relates to blood pressure measurement values, is only admitted to a method for transmitting information when the evaluation of the quality of the test data transmitted by him in advance shows that these also contain the measuring times.

To enable the method according to at least one embodiment of the invention to be triggered by an information provider, it is preferably provided that offer signaling data, which have been transmitted by an information provider to the transmission device are received and in response to these test request data are sent to the information provider by the transmission device.

The method according to at least one embodiment of the invention is preferably combined with a method for transmitting information between information providers and information seekers by a transmission device in which information enquiry data, which were transmitted by information seekers to the transmission device are received and in which information offer data are received which were transmitted by an admitted information provider to the transmission device and which represent information offered by the respective information provider. The information enquiry data and the information offer data can then be compared with one another for determining corresponding information enquiry data and information offer data and search result data can be transmitted to a terminal of an information seeker if the information enquiry data of the information seeker correspond to the information offer data of an information provider.

The information offer data preferably only contains some parameters which point out which information is offered. For example, the information offer data can say that data for a particular illness are available, possibly the period from which these data originate and how may data are available. The information offer data should, on the one hand, preferably be extensive enough that a meaningful prior comparison with information enquiry data of the individual information seekers can be performed and, on the other hand, these information offer data should not reveal too much about the information actually offered since, of course, the information represents the actual value.

The search result data can preferably be a list of the information offer data corresponding to the information enquiry data, which, for example, includes the titles of the information offered or of the information offer data, the names of the information providers, the prices of the information offered, the evaluations and the ranking of evaluation of the qualities of the information offered, the evaluations or the ranking of evaluation of the provider and/or evaluation histories.

To provide for reliable transmission, particularly of sensitive person-related or valuable information or data, the transmission of test data, information offer data, information enquiry data and/or search result data between the respective transmitter and receiver is preferably encrypted.

For the long-term, and thus more informative evaluation of information providers and the information offered by these, the admission of the information provider by the transmission device to the method for transmitting information between information providers and information seekers is preferably made dependent on an evaluation history of the information provider. The evaluation history can be based, in particular, on past evaluations of the quality of test data which have been stored correlated with the corresponding information provider in the transmission device.

As an alternative or supplementary thereto, the evaluation history can also be based on past evaluations of the quality of information by information seekers to which the information has been communicated. For this purpose, the evaluation of the quality can be transmitted from the information seeker to the transmission device and stored correlated with the corresponding information provider in the transmission device.

At least one embodiment of the invention also includes a transmission device which, apart from an evaluation device which is constructed for evaluating the quality of test data exhibits a provider test interface device for receiving test data which had been transmitted from an information provider to the transmission device and which represent information offered by the information provider. In addition, the transmission device includes a control unit which is constructed in such a manner that the admission of the information provider to the transmission system is made dependent on the quality of the test data.

The transmission system preferably exhibits enquirer function units, associated in each case with the various information seekers in order to initially receive the information enquiry data of the information seekers and automatically forward them to the transmission device. Conversely, these enquirer function units can receive the search result data sent out by the transmission device for the relevant information seeker and sort and normalize the information offer data and/or data contained in the search result data via the information provider before the transmission to the information seeker or his terminal. In particular, it is possible to normalize in this manner price information in order to facilitate a comparison between the different offers for the enquirer. The enquirer function units can be configured in a similar manner and have similar functionalities as the personal agents of WO 97/26612 mentioned initially.

In the same manner, provider function units can be allocated in each case to the various information providers in order to initially receive the information offer data of the associated information providers and automatically forward them to the transmission device. These provider function units can also receive the information enquiry data matching the information offer data of the information provider and transmitted by the transmission device and initiate the detailed comparison with the information, represented by the information offer data, by the associated data comparison device. These provider function units, too, can be configured in similar form as the aforementioned personal software agents.

In principle, the data comparison devices allocated to the individual information providers can also be components of the transmission device. In this case, however, this must be a particularly secured area so that the individual provider can store the information there without others being able to look at this information. In principle, the data comparison devices allocated to the individual information providers can also be a number of data comparison devices—only a single data comparison device in the extreme case—which are only temporarily allocated to the individual information providers for the respective comparison operation.

It is particularly preferred, however, if the data comparison devices are in each case a component of the provider function units allocated to the relevant information providers and/or locally installed at the relevant information providers, i.e. on a server or terminal arranged there. This has the advantage that the valuable information does not need to be issued by the information provider but always remains within the sphere of influence of the information provider. In this case, however, it should be preferably ensured that the data comparison devices themselves or the process of the comparison are only subject to the control of the transmission system or the transmission device and cannot be manipulated by the information providers. This guarantees an objective comparison of the information offered with the information enquiry data of the enquirer.

BRIEF DESCRIPTION OF THE DRAWINGS

In the text which follows, the invention will be explained in greater detail with reference to an example embodiment and referring to the attached figures, in which.

DETAILED DESCRIPTION OF THE EXAMPLE EMBODIMENTS

Figure 1:
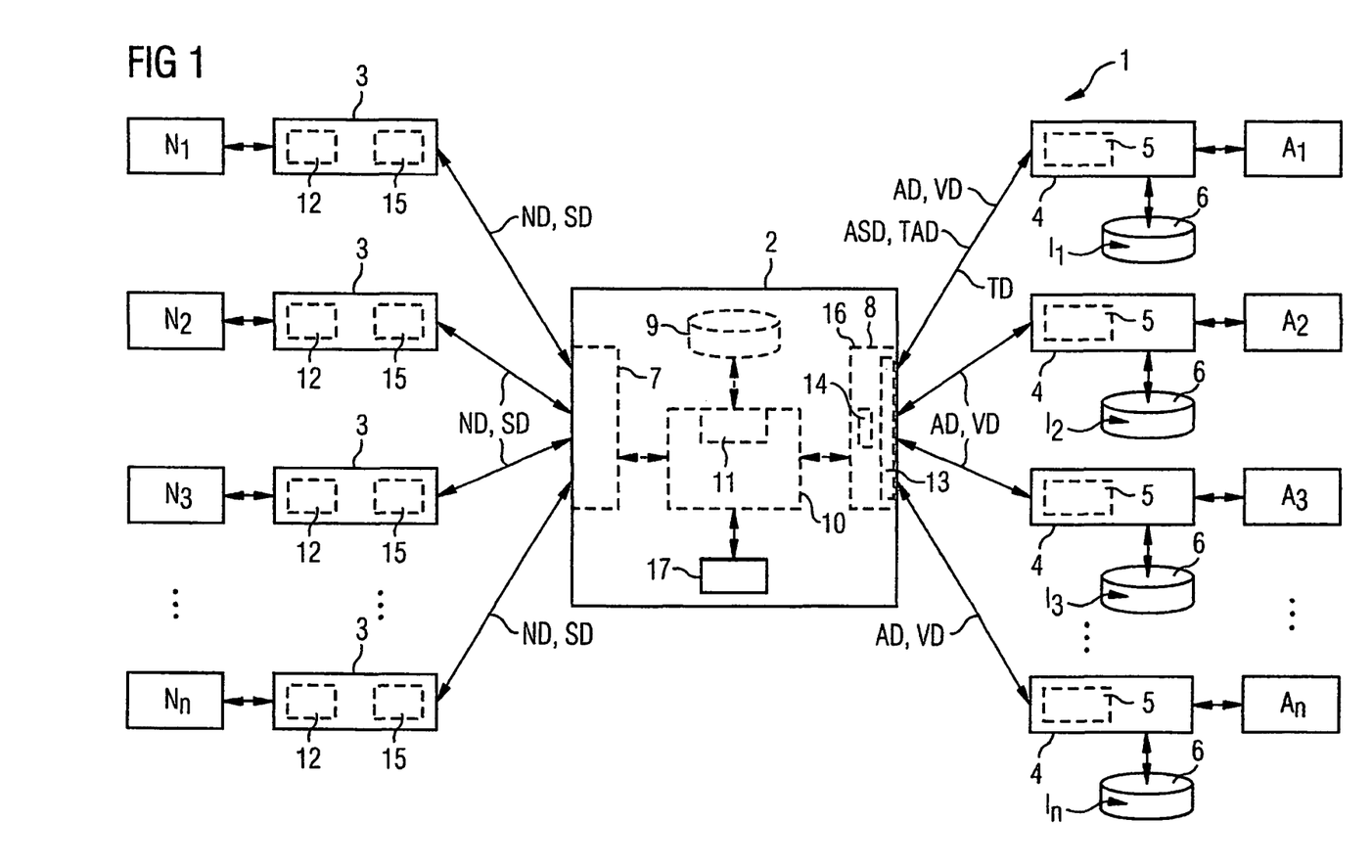
FIG. 1 shows a diagrammatic representation of an automatic transmission system.

The central component of the automatic transmission system 1 shown in FIG. 1 is a transmission device 2. This transmission device 2 can be installed, for example, on one or more networked servers in the form of hardware and/or software—and preferably predominantly in the form of software modules. In principle, this can also be a virtual market place already implemented on an internet server or the like which additionally exhibits the components or software modules, respectively, described in the text which follows or uses these in the manner according to the invention as described in the text which follows if it already has these functionalities.

It is clear that the transmission device 2 can also have other components and functionalities that are generally available to the virtual market places or similar transmission devices. However, such standard components and functions will not be discussed further in the description following and in the figures.

The transmission device 2 has an enquirer interface device 7 via which information enquiry data ND are received by the information seekers $N_1$ to $N_n$.

Communication between the information seekers $N_1$ to $N_n$ and the transmission device 2 takes place via enquirer function units 3 belonging to the transmission system 1. These enquirer function units 3, also called enquirer agents 3 in the text which follows, can be implemented as software modules, for example, and run on a server on which the transmission device 2 is also implemented. As an alternative, the enquirer agents 3 can also be implemented as software modules on a terminal of the respective information seeker $N_1$ to $N_n$.

As a subordinate software module, such an enquirer agent 3 contains, on the one hand, an anonymizing unit 12 which initially anonymizes the information enquiry data ND input by the information seeker $N_1$ to $N_n$ before it is forwarded to the transmission device 2 and, on the other hand, a data conditioning module 15 in order to condition search result data which are to be transmitted from the transmission device to the information seeker $N_1$ to $N_n$ after a successful search, for example to sort them by providers or to normalize them with respect to the pricing. Thus, the information seeker $N_1$ to $N_n$ is able to compare the individual information offers in a relatively comfortable way.

In the example embodiment shown, the transmission device 2 also has a control device 10 which is implemented in the form of a software module on a server. A part of this control unit 10 is a precomparison unit 11 in the form of a software module for comparing information enquiry data ND and information offer data AD for correspondence. In addition, the transmission device 2 contains a memory 9 where the information enquiry data ND and information offer data AD are temporarily stored.

The transmission device 2 also exhibits a provider interface device 8 in order to receive information offer data AD from various information providers $A_1$ to $A_n$. Here, too, similar to the information seekers $N_1$ to $N_n$, communication with the information providers $A_1$ to $A_n$ takes place via the provider function units 4, also called provider agents 4 in the text which follows. The provider agents 4 are installed in the form of software modules on a server of the relevant information provider $A_1$ to A.

In the example embodiment shown, the provider agents 4 in each case have a data comparison device 5 in the form of a software submodule. This data comparison device 5 is used for comparing information enquiry data ND, transmitted via the transmission device 2 to the provider agent 4, with the information $I_1$ to $I_n$ actually offered by the information provider $A_1$ to $A_n$. This information $I_1$ to $I_n$ is stored in a memory 6 which can be accessed by the respective provider agent 4.

In the example embodiment shown, the provider agents 4, and thus also the data comparison device 5, are automatically installed on the server of the respective information provider $A_1$ to $A_n$ by an agent manager 14 of the comparison device 2. The data comparison device 5 is constructed in such a manner that it cannot be modified by the respective information provider $A_1$ to $A_n$ and performs the comparison in accordance with the instructions specified by the transmission device 2 or, respectively, by the operator of the transmission device 2. This variant ensures, on the one hand, that the respective information providers $A_1$ to $A_n$ do not need to issue their valuable information $I_1$ to $I_n$ and, on the other hand, that an objective comparison of the information offered with the information enquiry data ND of the individual information seekers $N_1$ to $N_n$ is performed.

In the example embodiment shown, the provider interface device 8 of the transmission device 2 also has an anonymization module 13 which first annoymizes information offer data AD sent to the transmission device 2 by the information providers $A_1$ to $A_n$.

The annoymization guarantees for each site, at least during the preliminary comparison, that the individual information seekers and information providers can look for a suitable "partner" without it becoming generally known, particularly to competitors, what type of information the individual information seekers $N_1$ to $N_n$ are seeking or, respectively, can be offered by the information providers $A_1$ to $A_n$.

Apart from the provider interface device 8, the transmission device 2 has a provider test interface device 16 for receiving test data TD which have been transmitted to the transmission device 2 by an information provider $A_1$ and which represent information $I_1$ offered by the information provider $A_1$. This provider test interface device 16 has been drawn as a unit with the provider interface device 8. Depending on the variant of embodiment, however, the provider test interface device 16 can also be designed as hardware or software module independent of the provider interface device 8.

The control unit 10 is also connected to an evaluation module 17 which can also be implemented as part of the control unit 10 in accordance with another variant of embodiment. This evaluation module 17 which can be formed as program-controlled processor device is programmed in such a manner that it can perform an evaluation, particularly of the quality of test data TD with regard to certain criteria. The result of the evaluation is transmitted to the control unit 10 and is then used as basis for a decision about admitting an information provider $A_1$ who has provided the test data TD.

In the memory 9, the evaluation of the quality of the test data TD which have been determined are stored in correlation with the information provider $A_1$ who has provided the corresponding test data TD, in order to create an evaluation history in the memory 9. This evaluation history can preferably be a supplementary or alternative basis for a decision about the admission of an information provider $A_1$ associated with the evaluation history.

For the encryption of the data which are transmitted between the transmission device 2, the information providers $A_1$ to $A_n$ and the information seekers $N_1$ to $N_n$, encryption devices not shown in the drawing are provided at the enquirer function units 3, and the provider function units 4 and at the transmission device 2.

Figure 2:
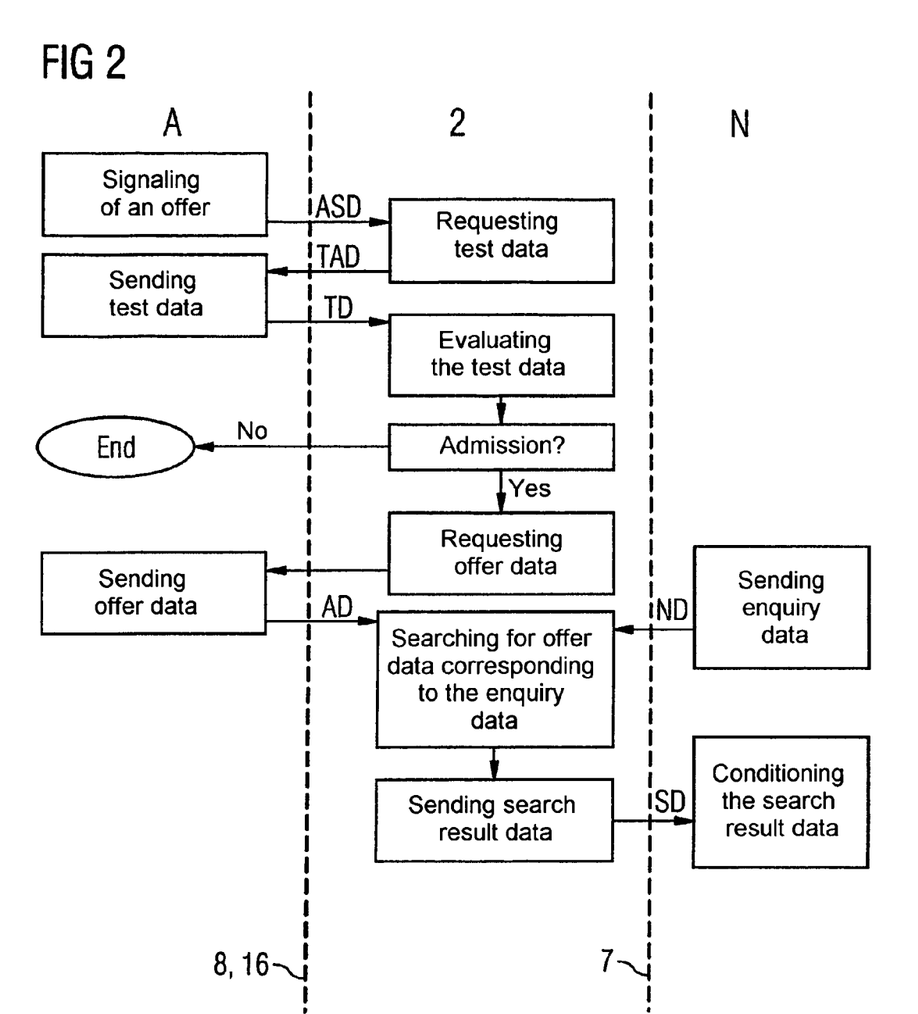
FIG. 2 shows a flow chart of a method for admitting an information provider to a method for transmitting information.

In the text which follows, a typical sequence of a method from the signaling of an offer by an information provider to the transmission of an information provider to an information seeker will be explained in greater detail with reference to the flow chart shown in FIG. 2. FIG. 2 shows to the left of the left-hand dashed line, which represents the provider interface 8 and, particularly, the provider test interface 16, the sequence on the information provider side A, to the right of the right-hand dashed line, which represents the enquirer interface 7, the sequence of the information seeker side, and between the two dashed lines, the sequence at the transmission device 2.

In this example, a clinic, as information provider A, signals in a first step (signaling of an offer) to the transmission device 2, acting as information broker, by transmitting offer signaling data ASD that it has data relating to blood pressure measurement values to offer or to be switched. The transmission device thereupon requests, by sending test request data TAD to the clinic A test data TD from the clinic A which thereupon are sent by the clinic A to the transmission device 2.

A classifying input filter of the transmission device 2 is set up in such a manner that data relating to blood pressure measurement values are forwarded to an evaluation module 17. The quality of the test data TD is then evaluated in the next step (evaluation of the test data) by the evaluation module 17. In this case, it is checked whether the test data TD also include the respective measurement time in addition to the blood pressure measurement values. If this is so, the test data TD exhibit adequate quality and the provider A is admitted to the information transmission method. If the test data TD do not have the measuring times, the test data TD do not exhibit adequate quality and the provider A is not admitted to the information transmission method. In this case, the method ends by the provider A being informed about the nonadmission and the reasons for the nonadmission.

If the clinic is admitted as information provider, the clinic is requested to send corresponding information offer data AD via its provider agent 4 to the transmission device 2 (sending of offer data). These are stored there in the memory 9. These information offer data AD only contain some parameters which describe what information is offered in which extent at which price.

In parallel with or after the admission check, a pharmaceutical undertaking is now looking for blood pressure measurement values and attempting to find a provider, for example a clinic which has such blood pressure measurement values. For this purpose, the enquirer function unit 3 on the enquiry side obtains the information enquiry data ND from the information seeker N, in this case the clinic. This enquirer function unit 3 anonymizes the information enquiry data ND with the aid of its anonymizing module 12 and then forwards the anonymized information enquiry data ND to the transmission device 2 (sending of enquiry data).

After the transmission device 2 has received the anonymized information enquiry data ND, corresponding information offer data AD are looked for.

This search process, which is not shown in greater detail in the drawing, can have the following form. In the first search method step, the transmission device 2 first looks for corresponding information offer data AD in its own database, i.e. a preliminary comparison of the information enquiry data ND with the information offer data AD of the individual information providers $A_1$ to $A_n$, stored in the memory 9, is performed. If this preliminary comparison has a positive result and matching information offer data AD are found, the transmission device 2 sends the information enquiry data to the data comparison device 5 of the relevant information provider or providers $A_1$ to $A_n$. If not, the process jumps back into the main routine.

The information enquiry data ND sent to the individual comparison devices 5 of the potential information providers $A_1$ to $A_n$ in the case of a success are there compared with the actual information $I_1$ to $I_n$ offered. In the actual exemplary embodiment, in which a pharmaceutical undertaking is looking for blood pressure measurement values, the information enquiry data ND sent to the comparison device 2 by the pharmaceutical undertaking are distributed to the individual hospitals which, according to their information offer data AD, can offer suitable information. The individual clinics, in the computer systems of which the provider agents 4 with the data comparison devices 5 are installed, then perform a comparison without the blood pressure measurement values leaving the secure area of the clinic up to this point in time. During this process, all required types of data which could be of interest to the pharmaceutical undertaking are individually examined step by step, i.e. the information enquiry data ND of the pharmaceutical undertaking are compared in detail with the information $I_1$ to $I_n$ to be offered.

The result data VD of the comparison are then sent back to the transmission device 2 and, finally, the process jumps back into the main routine.

The comparison result data VD contain, for example, more accurate information about, to what extent and possibly also precisely in what parts the respective information $I_1$ to $I_n$ actually covers the information enquiry and the quality exhibited by the respective information $I_1$ to $I_n$. These can simply be values which state that, for example, the information enquiry can be satisfied up to a certain percentage, or it can also already contain more accurate information, for example that the blood pressure measurement values are also available specifically according to sex or also only for certain ages, for example only for children.

In the case of a positive result of the comparison, that is to say, for example, if the comparison result has achieved a matching above a predetermined threshold, the control unit 10 causes corresponding search result data SD to be sent back to the enquirer agent 3 of the relevant information seeker $N_1$ to $N_n$ (sending of search result data).

In the enquirer agent 3, the search result data SD are then conditioned with the aid of the data conditioning module 15. Thus, for example, if the transmission device 2 has been successful several times and has found a number of information providers $A_1$ to $A_n$ whose information $I_1$ to $I_n$ could fit the information enquiry data ND of the respective information seeker, the individual offers can be sorted and possibly also normalized. The search result data SD thus conditioned are then sent to the terminal, as a rule a PC or server, of the information seeker $N_1$ to $N_n$ At that point, the search result data SD can also already contain information about the respective information provider. A further variant provides that up to this point in time, the information providers $A_1$ to $A_n$ are still anonymous and a direct contact between the information seeker $N_1$ to $N_n$ and the relevant information provider $A_1$ to $A_n$ is only established, for example via the transmission device 2, when the information seeker $N_1$ to $N_n$ is interested in the respective information $I_1$ to $I_n$.

Furthermore, it is also possible that the exchange of information and the payment are preformed completely anonymously with the aid of the transmission device 2, the transmission device 2 having to be equipped correspondingly in this case in such a manner that it has the required payment functionalities so that the information seeker $N_1$ to $N_n$ makes the required payment before he obtains the information $I_1$ to $I_n$ form the information provider $A_1$ to $A_n$ or, respectively, from the transmission device 2. The most varied methods for guaranteeing reliable payment via a data transmission system such as the internet are known to the expert.

Finally, it is pointed out again that the system architecture and the method sequence shown in the figures are only example embodiments which can be widely varied by the expert without departing from the scope of the invention.

Thus, for example, a multiplicity of various methods, known per se, can be used individually or in combination for evaluating test data TD. The anonymization modules 12 or the data conditioning modules 15 can also be centrally implemented in the transmission device 2 instead of in the individual enquirer agents 3. Conversely, the anonymization module 13 can be implemented in each case in the form of individual modules in the provider agents 4.

Furthermore the transmission device 2 can have—unlike the drawings in the figures—e.g. also separate enquirer interface devices for receiving information enquiry data ND of the information seekers and for sending search result data SD to the terminals of the relevant information seekers or correspondingly have separate provider interface devices 8 for receiving information offer data AD of the information providers and for sending information enquiry data ND to the data comparison devices 5 of the various information providers $A_1$ to $A_n$.

The search process can also be performed completely centrally in the transmission device 2 after the information needed for this has first been transmitted to the transmission device.

Instead of blood pressure measurement values or patient data for a particular type of illness, the data can also be, in particular, demographic data, for example customer data which an undertaking wishes to acquire in order to perform on the basis of these data a consumer analysis by which it can then better orientate its own offer.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for admitting an information provider to a system for transmitting information via a transmission device for transmitting information between information providers and information seekers, the method comprising:
   receiving test data transmitted by an information provider to the transmission device, the test data representing information offered by the information provider;
   evaluating the quality of the test data by the transmission device;
   admitting, by the transmission device, the information provider to the system for transmitting information between the information providers and the information seekers depending on the quality of the test data; and
   matching one or more information seekers with the information provider in response to information enquiry data from the one or more information seekers; wherein
   the admission of the information provider to the system for transmitting information between the information providers and the information seekers enables the information provider to provide information to the one or more information seekers in response to the information enquiry data from the one or more information seekers.

2. The method as claimed in claim 1, wherein the reception of test data is preceded by the following steps:
   receiving offer signaling data which have been transmitted to the transmission device by the information provider, and
   sending test request data from the transmission device to the information provider.

3. The method as claimed in claim 1, further comprising:
   receiving the information enquiry data transmitted to the transmission device by the one or more information seekers;
   receiving information offer data which has been transmitted to the transmission device by the information provider and which represents information offered by the information provider; and wherein the matching of the one or more information seekers with the information provider includes,
comparing the information enquiry data and the information offer data for determining corresponding information enquiry data and information offer data, and
transmitting search result data to a terminal of an information seeker if the information enquiry data of the information seeker corresponds to the information offer data of the information provider.

4. The method as claimed in claim 1, wherein at least one of test data and information offer data are transmitted encrypted between the information provider and the transmission device.

5. The method as claimed in claim 3, wherein at least one of information enquiry data and search result data are transmitted encrypted between the information seeker and the transmission device.

6. The method as claimed in claim 1, wherein the evaluation of the quality of the test data is stored in correlation with the information provider in the transmission device in order to generate an evaluation history correlated with the information provider, and wherein the admission of the information provider by the transmission device is dependent on the evaluation history of the information provider.

7. The method as claimed in claim 1, wherein the quality of the information transmitted to an information seeker is evaluated by the information seeker, wherein the evaluation of the quality is transmitted from the information seeker to the transmission device and stored in correlation with the information provider in the transmission device in order to generate an evaluation history correlated with the information provider, and wherein the admission of the information provider by the transmission device is dependent on the evaluation history of the information provider.

8. The method as claimed in claim 1, wherein at least one of,
an information seeker first transmits the information enquiry data to an enquirer function unit allocated to the information seeker and the information enquiry data are automatically forwarded at least partially from the enquirer function unit to the transmission device, and
the transmission device transmits the search result data to the enquirer function unit which sorts or normalizes at least one of information offer data contained therein and associated information provider data, before being transmitted to the information seeker.

9. The method as claimed in claim 1, wherein at least one of,
the information provider first transmits the information offer data to a provider function unit associated with the information provider and the information offer data are automatically forwarded at least partially from the provider function to the transmission device, and
the transmission device transmits information enquiry data matching the information offer data of the information provider to the provider function unit which initiates the more detailed comparison with the information represented by the information offer data by the associated data comparison device.

10. The method as claimed in claim 1, wherein the evaluation of at least one of the quality and the evaluation history is transmitted to the information seeker.

11. A transmission device, comprising:
a provider test interface device to receive test data transmitted to the transmission device by an information provider, the test data representing information offered by the information provider;
an evaluation device to evaluate the quality of test data; and
a control unit to admit the information provider to a system for transmitting information between information providers and information seekers depending on the quality of the test data; wherein
the transmission device is configured to match one or more information seekers with the information provider in response to information enquiry data from the one or more information seekers, and
the admission of the information provider to the system for transmitting information between information providers and information seekers enables the information provider to provide information to the one or more information seekers in response to the information enquiry data from the one or more information seekers.

12. The transmission device as claimed in claim 11, further comprising:
a number of enquirer interface devices to receive information enquiry data transmitted to the transmission device by the one or more information seekers, and for sending search result data to terminals of relevant information seekers;
a number of provider interface devices to receive information offer data which were transmitted to the transmission device by information providers and which represents information offered by the information providers;
a comparison unit to compare the information enquiry data and the information offer data for determining corresponding information enquiry data and information offer data; and
a control unit which causes search result data to be transmitted to the terminal of an information seeker if the information enquiry data of the relevant information seeker corresponds to the information offer data of an information provider.

13. The transmission device as claimed in claim 11, further comprising:
a storage device to store the evaluation of the quality of test data.

14. The transmission device as claimed in claim 12, further comprising:
a storage device to store the evaluation of the quality of test data.

15. The method as claimed in claim 4, wherein at least one of information enquiry data and search result data are transmitted encrypted between an information seeker and the transmission device.

16. A transmission device, comprising:
test interface means for receiving test data transmitted to the transmission device by an information provider, the test data representing information offered by the information provider;
evaluation means for evaluating the quality of test data;
control means for determining whether to admit the information provider to a system for transmitting information between information providers and information seekers depending on the quality of the test data; and
a matching means for matching one or more information seekers with the information provider in response to information enquiry data from the one or more information seekers; wherein
the admission of the information provider to the system for transmitting information between information providers and information seekers enables the information provider to provide information to the one or more information seekers in response to the information enquiry data from the one or more information seekers.

17. The transmission device as claimed in claim 16, further comprising:
   a number of enquirer interface means for receiving information enquiry data transmitted to the transmission device by the one or more information seekers, and for sending search result data to terminals of relevant information seekers;
   a number of provider interface means for receiving information offer data transmitted to the transmission device by information providers and which represent information offered by respective information providers;
   comparison means for comparing the information enquiry data and the information offer data for determining corresponding information enquiry data and information offer data; and
   control means for causing search result data to be transmitted to the terminal of an information seeker if the information enquiry data of the relevant information seeker corresponds to the information offer data of an information provider.

18. The transmission device as claimed in claim 16, further comprising:
   storage means for storing the evaluation of the quality of test data.

19. The transmission device as claimed in claim 17, further comprising:
   storage means for storing the evaluation of the quality of test data.

\* \* \* \* \*